US011541450B2

(12) United States Patent
Suehiro et al.

(10) Patent No.: US 11,541,450 B2
(45) Date of Patent: Jan. 3, 2023

(54) SHAFT FOR STEERING DEVICE, METHOD OF MANUFACTURING SHAFT FOR STEERING DEVICE, AND ELECTRIC POWER STEERING DEVICE

(71) Applicant: NSK Ltd., Tokyo (JP)

(72) Inventors: Tatsuya Suehiro, Gunma (JP); Kaname Yasuda, Gunma (JP); Kazuya Yamada, Gunma (JP)

(73) Assignee: NSK LTD., Tokyo (JP)

( * ) Notice: Subject to any disclaimer, the term of this patent is extended or adjusted under 35 U.S.C. 154(b) by 516 days.

(21) Appl. No.: 16/496,596

(22) PCT Filed: Feb. 13, 2018

(86) PCT No.: PCT/JP2018/004895
§ 371 (c)(1),
(2) Date: Sep. 23, 2019

(87) PCT Pub. No.: WO2018/179929
PCT Pub. Date: Oct. 4, 2018

(65) Prior Publication Data
US 2020/0290113 A1 Sep. 17, 2020

(30) Foreign Application Priority Data

Mar. 27, 2017 (JP) .............................. JP2017-061871
Aug. 21, 2017 (JP) .............................. JP2017-158720

(51) Int. Cl.
*B21J 5/02* (2006.01)
*B21J 5/10* (2006.01)
(Continued)

(52) U.S. Cl.
CPC .................. *B21K 1/12* (2013.01); *B21C 1/24* (2013.01); *B21J 5/008* (2013.01); *B21J 5/02* (2013.01);
(Continued)

(58) Field of Classification Search
CPC ......... B21J 5/02; B21J 5/10; B21J 5/12; B21J 5/008; B21J 5/06; B21J 9/06; B62D 1/20;
(Continued)

(56) References Cited

U.S. PATENT DOCUMENTS 5,105,644 A * 4/1992 Simon ...................... B21K 1/06
72/260
5,213,250 A * 5/1993 Simon ...................... B21K 1/12
228/114
(Continued)

FOREIGN PATENT DOCUMENTS

CN 106466702 A 3/2017
EP 3 456 430 A1 3/2019
(Continued)

OTHER PUBLICATIONS

Communication dated Jul. 27, 2021, from the China National Intellectual Property Administration in application No. 201880021418.7.
(Continued)

*Primary Examiner* — Keith J Frisby
(74) *Attorney, Agent, or Firm* — Sughrue Mion, PLLC

(57) ABSTRACT

To provide a method of manufacturing a shaft for a steering device, the shaft including a spline shaft part to be coupled with an input shaft, a stopper part to be coupled with an output shaft, and an intermediate shaft part that couples the spline shaft part with the stopper part. The method includes: a step of forming a hole part recessed in an axial direction from one end of a pillar-shaped material by forging; and a step of pressing the material in which the hole part has been formed into a die to perform drawing in a radial direction on a portion of the material at which the spline shaft part and (Continued)

the intermediate shaft part are formed, and prolonging a length along the axial direction of the hole part at the same time by forging.

6 Claims, 11 Drawing Sheets

(51) Int. Cl.
  *B21J 5/12* (2006.01)
  *B62D 1/20* (2006.01)
  *B62D 5/04* (2006.01)
  *B21K 1/12* (2006.01)
  *B21K 1/10* (2006.01)
  *B21K 21/12* (2006.01)
  *B21K 21/08* (2006.01)
  *F16C 3/02* (2006.01)
  *B21C 1/24* (2006.01)
  *F16D 1/02* (2006.01)
  *B21K 1/06* (2006.01)
  *B21J 5/00* (2006.01)

(52) U.S. Cl.
  CPC . *B21J 5/10* (2013.01); *B21J 5/12* (2013.01); *B21K 1/063* (2013.01); *B21K 1/066* (2013.01); *B21K 1/10* (2013.01); *B21K 21/08* (2013.01); *B21K 21/12* (2013.01); *B62D 1/20* (2013.01); *B62D 5/04* (2013.01); *F16C 3/02* (2013.01); *F16D 1/02* (2013.01); *F16C 2220/46* (2013.01); *F16C 2326/24* (2013.01)

(58) Field of Classification Search
  CPC .......... B62D 5/04; F16D 1/02; B21C 23/205; B21C 23/20; B21C 1/24; B21C 1/26; B21C 1/18; B21K 1/063; B21K 1/06; B21K 1/066; B21K 1/12; B21K 1/10; B21K 21/12; B21K 21/14; B21K 21/08; F16C 3/02; F16C 2220/46; F16C 2326/24
  USPC .............................................. 74/492; 180/400
  See application file for complete search history.

(56) References Cited

U.S. PATENT DOCUMENTS

| | | | |
|---|---|---|---|
| 6,068,296 | A | 5/2000 | Tomaru et al. |
| 9,975,163 | B2 | 5/2018 | Sato |
| 2010/0108430 | A1 | 5/2010 | Uchihara et al. |
| 2014/0200086 | A1 | 7/2014 | Kurokawa |
| 2015/0367680 | A1* | 12/2015 | Pale ........................ B21J 5/08 72/370.11 |
| 2017/0050228 | A1 | 2/2017 | Sato |

FOREIGN PATENT DOCUMENTS

| | | | |
|---|---|---|---|
| JP | 50-80260 | A | 6/1975 |
| JP | 57-90415 | A | 6/1982 |
| JP | 10-002342 | A | 1/1998 |
| JP | 3409614 | B2 | 5/2003 |
| JP | 2005-329477 | A | 12/2005 |
| JP | 2010-019370 | A | 1/2010 |
| JP | 2010-065715 | A | 3/2010 |
| JP | 2011-062717 | A | 3/2011 |
| JP | 4972136 | B2 | 7/2012 |
| JP | 2017-039146 | A | 2/2017 |
| KR | 10-2015-0093942 | A | 8/2015 |
| KR | 20150093942 | A * | 8/2015 |
| KR | 10-2016-0006431 | A | 1/2016 |
| KR | 10-1671716 | B1 | 11/2016 |
| KR | 10-1685496 | B1 | 12/2016 |
| WO | 2018/179928 | A1 | 10/2018 |
| WO | 2018/235222 | A1 | 12/2018 |

OTHER PUBLICATIONS

International Search Report dated May 15, 2018, in International Application No. PCT/JP2018/004879.
Office Action dated Jun. 5, 2020 from the State Intellectual Property Office of the P.R.C. in Application No. 201880021418.7.
Extended European Search Report dated Mar. 3, 2021 from the European Patent Office in EP Application No. 18774410.7.
International Search Report of PCT/JP2018/004895 dated May 15, 2018.

* cited by examiner

SHAFT FOR STEERING DEVICE, METHOD OF MANUFACTURING SHAFT FOR STEERING DEVICE, AND ELECTRIC POWER STEERING DEVICE

CROSS REFERENCE TO RELATED APPLICATIONS

This application is a National Stage of International Application No. PCT/JP2018/004895 filed Feb. 13, 2018, claiming priority based on Japanese Patent Application No. 2017-061871 filed Mar. 27, 2017 and Japanese Patent Application No. 2017-158720 filed Aug. 21, 2017.

FIELD

The present invention relates to a shaft for a steering device, a method of manufacturing the shaft for a steering device, and an electric power steering device.

BACKGROUND

Steering devices of an automobile and the like include a steering shaft, an intermediate shaft, and the like for transmitting steering torque input from a steering wheel to a wheel side. Patent Literature 1 discloses a shaft member obtained by coupling a plurality of shafts with each other by press-fitting. Patent Literature 2 discloses a technique of deep hole work by working, for example, a spool hole in a body lower valve for an electronically controlled automatic transmission vehicle.

CITATION LIST

Patent Literature

Patent. Literature 1: Japanese Patent Application Laid-open No. 2010-065715 A
Patent. Literature 2: Japanese Patent Application Laid-open No. 2005-329477 A

SUMMARY

Technical Problem

Such a steering shaft may be formed to have a hollow inner part to reduce the weight thereof. In Patent Literature 1, a second shaft is press-fitted to a hollow first shaft. Due to this, the number of components is large, and production cost may be increased due to a fitting process. Additionally, a plurality of shaft parts are used, so that production cost may be increased to perform welding for securing reliability of torque transmission, for example.

In Patent Literature 2, a deep whole is formed by cutting using a drill. In a case of forming a deep hole by applying such a technique to a steering shaft, a time required for cutting is prolonged, and production cost may be increased. In a case of performing cutting on a pillar-shaped material, position accuracy of the hole may be decreased, or a working defect may be generated due to cutting chips, so that a yield may be reduced.

The objective of the present invention is to provide a shaft for a steering device, a method of manufacturing the shaft for a steering device, and an electric power steering device that can reduce the weight and improve reliability of torque transmission at low cost.

Solution to Problem

A method of manufacturing a shaft for a steering device according to one embodiment of the present invention comprising a spline shaft part to be coupled with an input shaft, a stopper part to be coupled with an output shaft, and an intermediate shaft part that couples the spline shaft part with the stopper part is disclosed. The method includes a step of forming a hole part recessed in an axial direction from one end of a pillar-shaped material by forging, and a step of pressing the material in which the hole part has been formed into a die to perform drawing in a radial direction on a portion of the material at which the spline shaft part and the intermediate shaft part are formed, and prolonging a length along the axial direction of the hole part at the same time by forging. A mandrel is inserted into the hole part to perform the forging.

Due to this, the hole part of the spline shaft part is formed to be a deep hole by at least two times of forging. Thus, the weight of the shaft for a steering device can be reduced. Cutting is not performed in working the hole part, so that a working time and processes can be reduced, and production cost can be suppressed. A working defect due to the cutting can be prevented, and a yield can be improved. Additionally, the spline shaft part and the intermediate shaft part are formed from one material at the same time, so that there is no portion for coupling a plurality of members by fitting and the like, and reliability of torque transmission can be improved. Accordingly, the weight of the shaft for a steering device can be reduced, and reliability of torque transmission can be improved at low cost.

As a desirable embodiment of the present invention, the method includes a step of forming a spline groove along the axial direction on an outer circumference of the spline shaft part by pressing the material into a die, by forging. Due to this, at the same time as spline groove work, deep hole work of extending the hole part along the axial direction can be performed. Accordingly, the processes can be reduced, and the weight can be reduced.

Due to this, even when force in a radial direction is applied to the hole part in drawing and the like, the mandrel supports the inner part of the hole part to prevent the hole part from being crushed.

As a desirable embodiment of the present invention, the length along the axial direction of the hole part is prolonged, and a diameter of the hole part is reduced, by forging. Due to this, the diameter of the hole part is reduced, and the length of the hole part along the axial direction can be further prolonged.

As a desirable embodiment of the present invention, the hole part is continuously formed along the axial direction from an end part of the spline shaft part to the intermediate shaft part. Due to this, the weight of the shaft for a steering device can be reduced.

As a desirable embodiment of the present invention, the length along the axial direction of the hole part is five or more times a diameter of the hole part. Due to this, the weight of the shaft for a steering device can be reduced. Additionally, the center of gravity and a natural frequency of the shaft for a steering device can be appropriately adjusted.

As a desirable embodiment of the present invention, the hole part includes a bottom face intersecting with the axial direction, and an inner wall surface along the axial direction, and a metal flow at a position overlapped with the bottom face is continuously formed along the inner wall surface. Due to this, strength of the shaft for a steering device can be improved.

As a desirable embodiment of the present invention, the metal flow in the vicinity of the inner wall surface is formed more densely than a metal flow in the vicinity of an outer circumference of the spline shaft part or the intermediate shaft part. Due to this, strength of the shaft for a steering device can be improved.

A method of manufacturing a shaft for a steering device according to one embodiment of the present invention that comprises a spline shaft part on which a spline groove is formed, a yoke including a pair of arms, and an intermediate shaft part that couples the spline shaft part with the yoke is disclosed. The method includes a step of forming a hole part recessed in an axial direction from one end of a pillar-shaped material by forging, and a step of pressing the material in which the hole part has been formed into a die to perform drawing in a radial direction on a portion of the material at which the spline shaft part and the intermediate shaft part are formed, and in a state in which a mandrel is inserted into the hole part, prolonging a length along the axial direction of the hole part at the same time by forging. Due to this, the hole part of the spline shaft part is formed to be a deep hole by at least two times of forging. Thus, the weight of the shaft for a steering device can be reduced. Cutting is not performed in working the hole part, so that the working time and the processes can be reduced, and the production cost can be suppressed. A working defect due to the cutting can be prevented, and the yield can be improved. Additionally, the spline shaft part and the intermediate shaft part are formed from one material at the same time, and there is no portion for coupling a plurality of members by fitting and the like, so that reliability of torque transmission can be improved. Accordingly, the weight of the shaft for a steering device can be reduced, and reliability of torque transmission can be improved at low cost.

A shaft for a steering device according to one embodiment of the present invention is disclosed. The shaft includes a spline shaft part to be coupled with an input shaft, a stopper part to be coupled with an output shaft, and an intermediate shaft part that is disposed integrally with the spline shaft part and the stopper part to couple the spline shaft part with the stopper part. An end part of the spline shaft part has a hole part that is recessed in an axial direction and has a uniform inner diameter. The hole part includes a bottom face intersecting with the axial direction, and an inner wall surface along the axial direction.

Due to this, the hole part is disposed in the spline shaft part, so that the weight of the shaft for a steering device can be reduced. The hole part is formed by forging without performing cutting, so that the working time and the processes can be reduced, the production cost can be suppressed, and the yield can be improved. Additionally, the spline shaft part, the intermediate shaft part, and the stopper part are integrally disposed, and there is no portion for coupling a plurality of members by fitting and the like, so that reliability of torque transmission can be improved at low cost. Thus, the weight of the shaft for a steering device can be reduced, and reliability of torque transmission can be improved at low cost.

As a desirable embodiment of the present invention, a length along the axial direction of the hole part is five or more times a diameter of the hole part. Due to this, the weight of the shaft for a steering device can be reduced. Additionally, the center of gravity and the natural frequency of the shaft for a steering device can be appropriately adjusted.

As a desirable embodiment of the present invention, a metal flow at a position overlapped with the bottom face is continuous along the inner wall surface. Due to this, the strength of the shaft for a steering device can be improved.

As a desirable embodiment of the present invention, the metal flow in the vicinity of the inner wall surface is denser than a metal flow in the vicinity of an outer circumference of the spline shaft part or the intermediate shaft part. Due to this, the strength of the shaft for a steering device can be improved.

Due to this, the hole part is disposed in the spline shaft part, so that the weight of the shaft for a steering device can be reduced. The hole part is formed by forging without performing cutting, so that the working time and the processes can be reduced, the production cost can be suppressed, and the yield can be improved. Additionally, the spline shaft part, the intermediate shaft part, and a yoke are integrally disposed, and there is no portion for coupling a plurality of members by fitting and the like, so that reliability of torque transmission can be improved. Thus, the weight of the shaft for a steering device can be reduced, and reliability of torque transmission can be improved at low cost.

An electric power steering device according to one embodiment of the present invention includes the shaft for a steering device, an output shaft coupled with the stopper part, the output shaft to which a reduction gear rotated by torque input from an electric motor is attached, and a torsion bar that couples the output shaft with the shaft for a steering device.

Due to this, the number of members of the electric power steering device is reduced, so that the weight can be reduced, and the production cost can be reduced.

Advantageous Effects of Invention

According to the present invention, the weight can be reduced, and reliability of torque transmission can be improved at low cost.

DESCRIPTION OF EMBODIMENTS

The following describes modes for carrying out the present invention (embodiments) in detail with reference to the drawings. The present invention is not limited to the embodiments described below. Components described below include a component that is easily conceivable by those skilled in the art, and substantially the same component. The components described below can be appropriately combined.

First Embodiment

Figure 1:
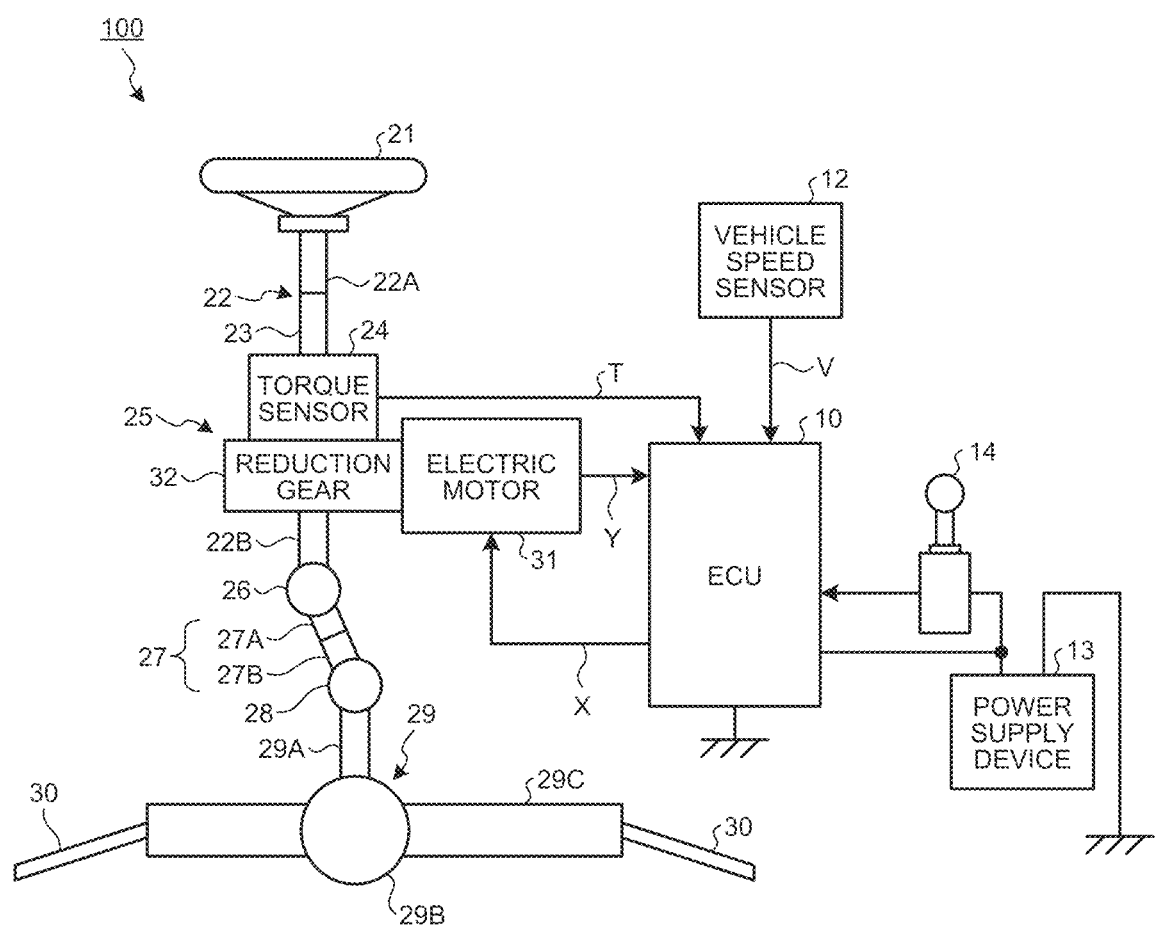
FIG. 1 is a configuration diagram illustrating an example of an electric power steering device including a steering shaft according to a first embodiment.
Figure 2:
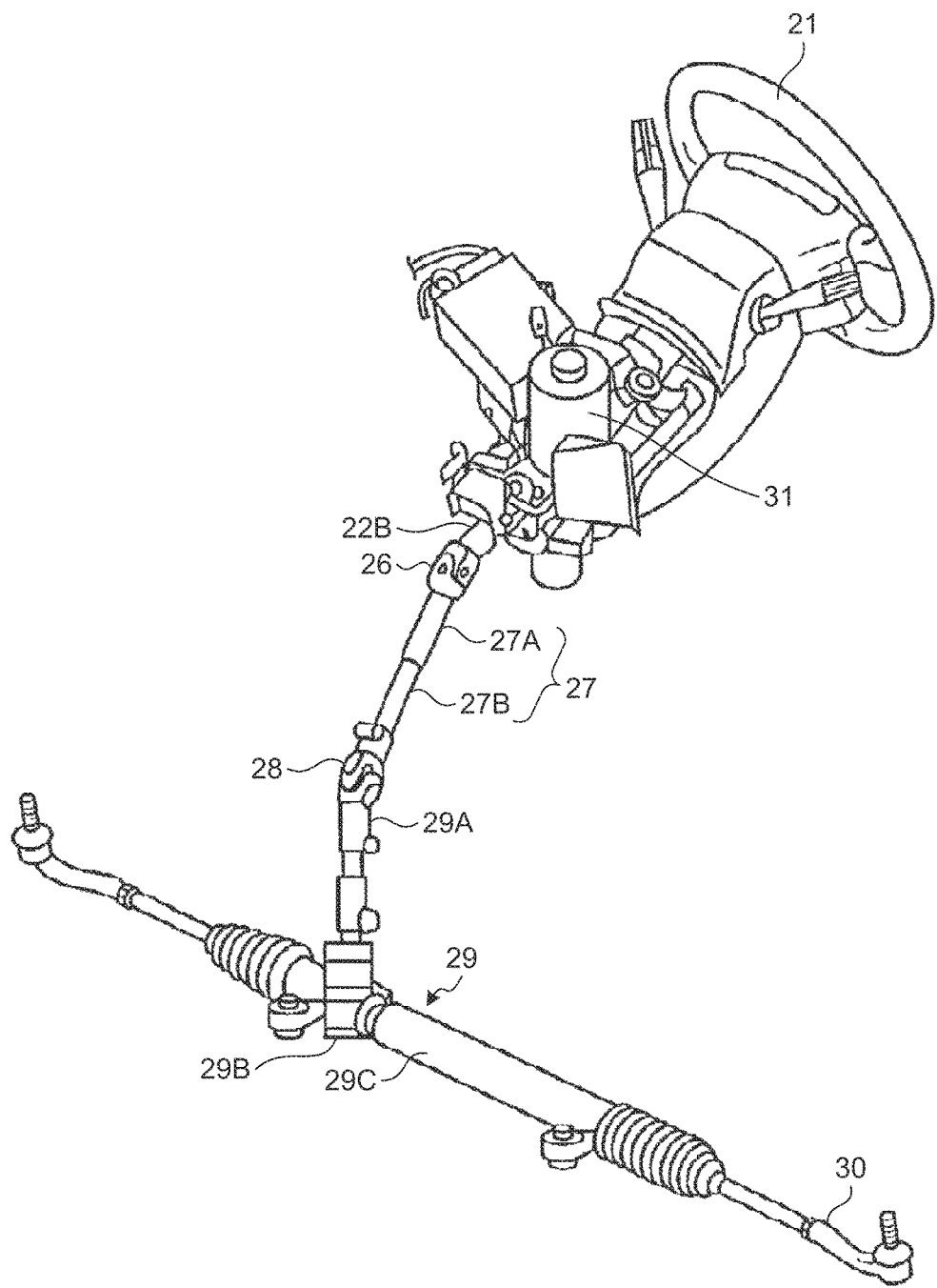
FIG. 2 is an explanatory diagram schematically illustrating the electric power steering device including the steering shaft according to the first embodiment.

FIG. 1 is a configuration diagram illustrating an example of an electric power steering device including a steering shaft according to a first embodiment. FIG. 2 is an explanatory diagram schematically illustrating the electric power steering device including the steering shaft according to the first embodiment. The following describes an outline of the electric power steering device with reference to FIG. 1 and FIG. 2.

As illustrated in FIG. 1, an electric power steering device 100 includes a steering wheel 21, a steering shaft 22, a torque sensor 24, an electric assist device 25, a universal joint 26, an intermediate shaft 27, a universal joint 28, a steering gear mechanism 29, and a tie rod 30, and force given from a driver (operator) is transmitted in this order. The electric power steering device 100 is column assist system in which at least part of the electric assist device 25 is supported by a steering column 41 (described later), and assist force is applied to the steering shaft 22.

The steering shaft 22 includes an input shaft 22A, an output shaft 22B, and a torque sensor shaft 23 disposed between the input shaft 22A and the output shaft 22B. One end part of the input shaft 22A is connected to the steering wheel 21, and the other end part thereof is connected to the torque sensor shaft 23. The torque sensor shaft 23 is connected to one end part of the output shaft 22B via the torque sensor 24. The steering shaft 22 is rotated by steering force applied to the steering wheel 21.

The torque sensor 24 detects steering torque T of the steering shaft 22. The torque sensor 24 is connected to an electronic control unit (ECU) 10, and outputs information of the detected steering torque T to the ECU 10.

The electric assist device 25 includes an electric motor 31 and a reduction gear 32. The electric motor 31 is an electric motor that generates auxiliary steering torque for assisting steering performed by the driver. The electric motor 31 may be a brushless motor, or may be a motor including a brush and a commutator. The electric motor 31 is connected to the reduction gear 32, and auxiliary steering torque is output to the reduction gear 32. The reduction gear 32 is rotated by the auxiliary steering torque input from the electric motor 31, and the torque is transmitted to the output shaft 22B.

The intermediate shaft 27 includes an upper shaft 27A and a lower shaft 27B. The upper shaft 27A is connected to the output shaft 22B via the universal joint 26. On the other hand, the lower shaft 27B is connected to a pinion shaft 29A of the steering gear mechanism 29 via the universal joint 28. The upper shaft 27A and the lower shaft 27B are spline-coupled, so that the upper shaft 27A and the lower shaft 27B can transmit torque of the output shaft 22D and can relatively move in a direction parallel with a center axis. Due to this relative movement, the intermediate shaft 27 stretches and contracts.

The steering gear mechanism 29 includes a rack and pinion mechanism, and includes a pinion shaft (input shaft) 29A, a pinion 29B, and a rack 29C. One end part of the pinion shaft 29A is connected to the intermediate shaft 27, and the other end part thereof is connected to the pinion 29B. The rack 29C engages with the pinion 29B. A rotational motion of the steering shaft 22 is transmitted to the steering gear mechanism 29 via the intermediate shaft 27. This rotational motion is converted into a linear motion by the rack 29C. The tie rod 30 is connected to the rack 29C.

A vehicle (not illustrated) on which the electric power steering device 100 is mounted includes the ECU 10, a vehicle speed sensor 12, a power supply device 13, an ignition switch 14, and the like illustrated in FIG. 1. The electric power steering device 100 is controlled by the ECU 10 included in the vehicle. The power supply device 13 is, for example, a vehicle-mounted battery device, and is connected to the ECU 10. When the ignition switch 14 turned ON, electric power is supplied from the power supply device 13 to the ECU 10.

Steering force of the driver input to the steering wheel 21 is transmitted to the reduction gear 32 of the electric assist device 25 via the input shaft 22A. At this point, the ECU 10 acquires, from the torque sensor 24, the steering torque T input to the input shaft 22A. The ECU 10 acquires a vehicle speed signal V from the vehicle speed sensor 12. The ECU 10 then calculates an auxiliary steering command value of an assist command based on the steering torque T and the vehicle speed signal V. The ECU 10 outputs a control signal X corresponding to the auxiliary steering command value to control the operation of the electric motor 31.

The auxiliary steering torque generated by the electric motor 31 is transmitted to the reduction gear 32. The ECU 10 acquires, from the electric motor 31, information of induced voltage or rotation information of a rotor as operation information Y. The reduction gear 32 applies the auxiliary steering torque to the output shaft 22B. The output shaft 22B outputs torque obtained by adding the auxiliary steering torque transmitted from the electric motor 31 to the steering torque T of the steering wheel 21. In this way, steering of the steering wheel 21 performed by the driver is assisted by the electric power steering device 100.

Figure 3:
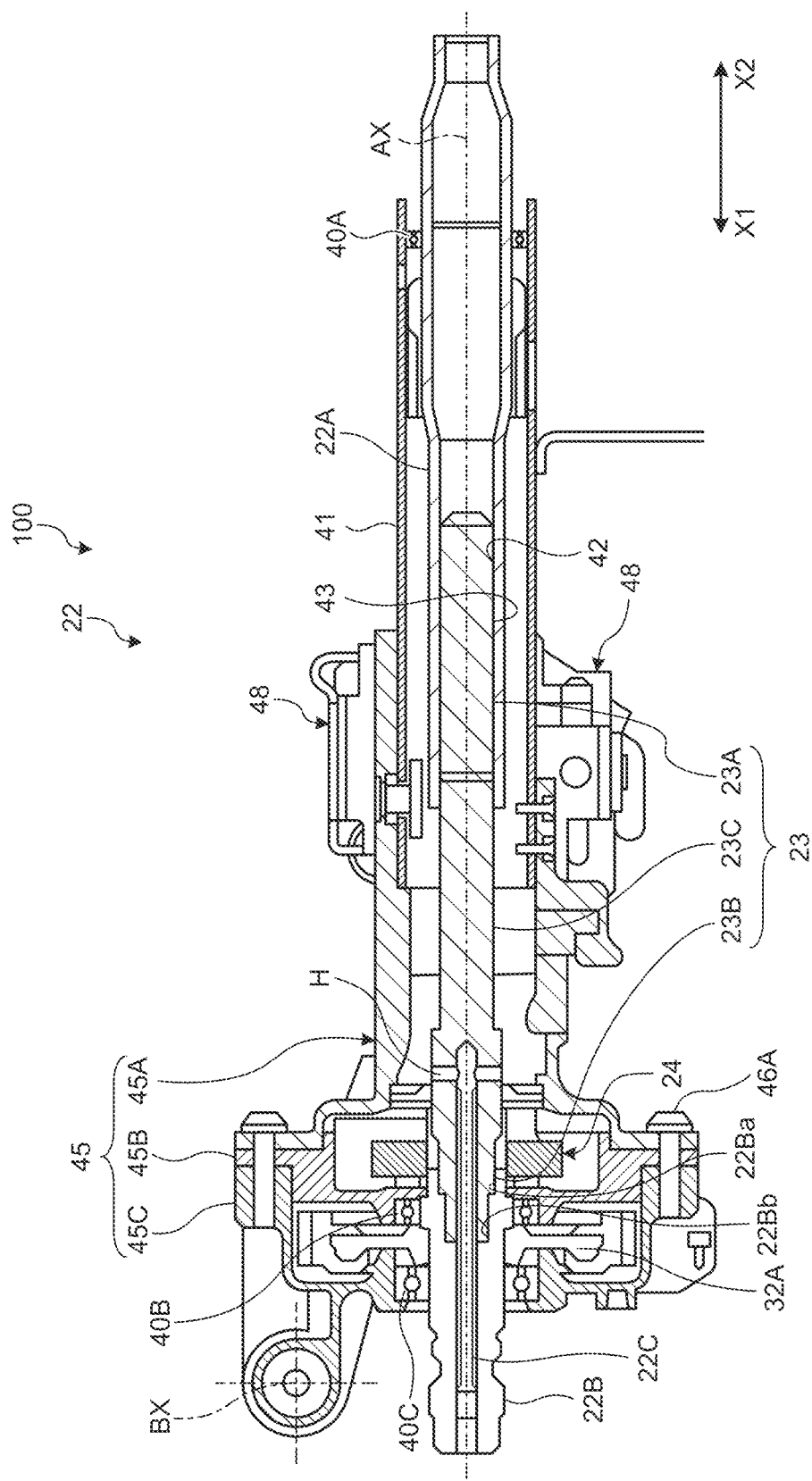
FIG. 3 is a cross-sectional view of the steering shaft according to the first embodiment.

Next, the following describes a configuration of the steering shaft 22 with reference to FIG. 3. FIG. 3 is a cross-sectional view of the steering shaft according to the first embodiment. In FIG. 3, among directions along a center axis AX of the steering shaft 22, a direction toward the intermediate shaft. 27 (refer to FIG. 1) is referred to as an X1 direction, and a direction toward the steering wheel 21 (refer to FIG. 1) is referred to as an X2 direction.

The electric power steering device 100 includes the steering shaft 22, the steering column 41, a housing 45, and a torsion bar 22C. The steering column 41 is a cylindrical member, which is fixed to a vehicle body attachment bracket 48 by a clamp mechanism, and attached to a vehicle body via the vehicle body attachment bracket 48. The housing 45 is disposed to be closer to the X1 direction side than the steering column 41.

At least part of the steering shaft 22 is disposed inside the steering column 41. In the present embodiment, the input shaft 22A and part of the torque sensor shaft 23 are disposed inside the steering column 41. A portion on the X1 direction side of the torque sensor shaft 23 and the output shaft 22B extend in the X1 direction with respect to the steering column 41. A bearing 40A is disposed on an inner peripheral surface of the steering column 41. The bearing 40A supports the input shaft 22A in a rotatable manner. As the bearing 40A, a rolling bearing that can support a radial load and a thrust load can be used.

The torque sensor shaft 23 includes a first shaft part 23A, a second shaft part 23B, and a third shaft part 23C. A spline groove 43 is disposed on an outer circumference of the first shaft part 23A. The spline groove 43 engages with a spline groove 42 disposed on an inner circumference of the input shaft 22A, and the torque applied to the input shaft 22A is transmitted to the first shaft part 23A. The first shaft part 23A can move in the axial direction relatively to the input shaft 22A. The second shaft part 233 engages with the output shaft 22B.

The third shaft part 23C extends in a direction along the center axis AX coaxially with the first shaft part 23A and the second shaft part 23B, and couples the first shaft part 23A with the second shaft part 23B. The third shaft part 23C has an outer diameter smaller than that of the second shaft part 23B. With such a configuration, the torque applied to the input shaft 22A is transmitted to the output shaft 22B via the torque sensor shaft 23. In this case, the torque sensor shaft 23 corresponds to a specific example of the "shaft for a steering device" according to the present invention. A detailed configuration of the torque sensor shaft 23 will be described later.

One end side of the torsion bar 22C is fixed to the second shaft part 23B by a pin, for example, via a through hole H disposed in the second shaft part 23B. The other end side of the torsion bar 22C is fixed to the output shaft 22B. Due to this, the torsion bar 22C couples the output shaft 22B with the torque sensor shaft 23. Twisting moment is generated in the torsion bar 22C in accordance with magnitude of the steering torque input to the torque sensor shaft 23, and the output shaft 22B rotates in a state of being displaced in a rotation direction relatively to the torque sensor shaft 23. The torque sensor 24 detects the steering torque based on a relative rotational displacement amount between the torque sensor shaft 23 and the output shaft 22B.

The housing 45 is disposed on an outer circumference of the output shaft 22B and the second shaft part 23B to be closer to the X1 direction side than the steering column 41. The housing 45 is made of a material having high thermal conductivity. The housing 45 is made of, for example, at least one of aluminum, an aluminum alloy, magnesium, and a magnesium alloy. For example, the housing 45 is manufactured by die-cast molding.

The housing 45 includes a first housing 45A, a second housing 45B, and a third housing 45C. The first housing 45A, the second housing 45B, and the third housing 45C are disposed in this order from the X2 direction side toward the X1 direction. The first housing 45A is a cylindrical member. The third shaft part 23C is disposed inside the first housing 45A. An end part in the X2 direction of the first housing 45A is fixed to the steering column 41. The first housing 45A is fixed to the second housing 45B and the third housing 45C via a fixing member 46A. The first housing 45A may be disposed integrally with the steering column 41. The first housing 45A, the second housing 45B, and the third housing 45C may be disposed integrally with each other.

The second housing 45B is disposed on the outer circumference of the second shaft part 23B and the output shaft 22B. The torque sensor 24 described above is disposed in an internal space surrounded by the first housing 45A and the second housing 45B. The third housing 45C is disposed on the outer circumference of the output shaft 22B. A worm wheel 32A of the reduction gear 32 described above is disposed in the internal space surrounded by the second housing 45B and the third housing 45C. The worm wheel 32A is connected to an output shaft of the electric motor 31 (refer to FIG. 1) via a worm (schematically illustrated), and transmits the auxiliary steering torque of the electric motor 31 to the output shaft 22B.

A bearing 40B is disposed on an inner peripheral surface of the second housing 45B, and a bearing 40C is disposed on an inner peripheral surface of the third housing 45C. The bearing 40C and the bearing 40C support the output shaft 22B in a rotatable manner. A tilt mechanism (not illustrated) and the like may be connected to the third housing 45C to enable the housing 45 to rotate about a tilt axis BX. Due to this, an angle of the center axis AX of the steering shaft 22 can be varied, and a position in a vertical direction of the steering wheel 21 can be adjusted by the clamp mechanism.

Figure 4:
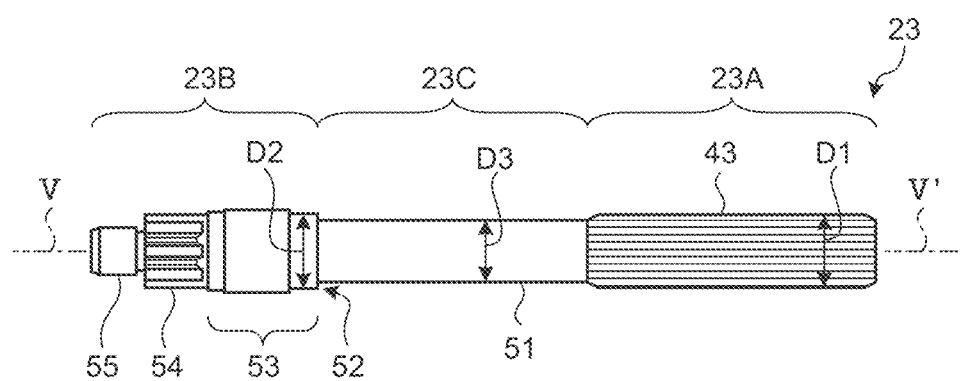
FIG. 4 is a front view of a torque sensor shaft according to the first embodiment.
Figure 5:
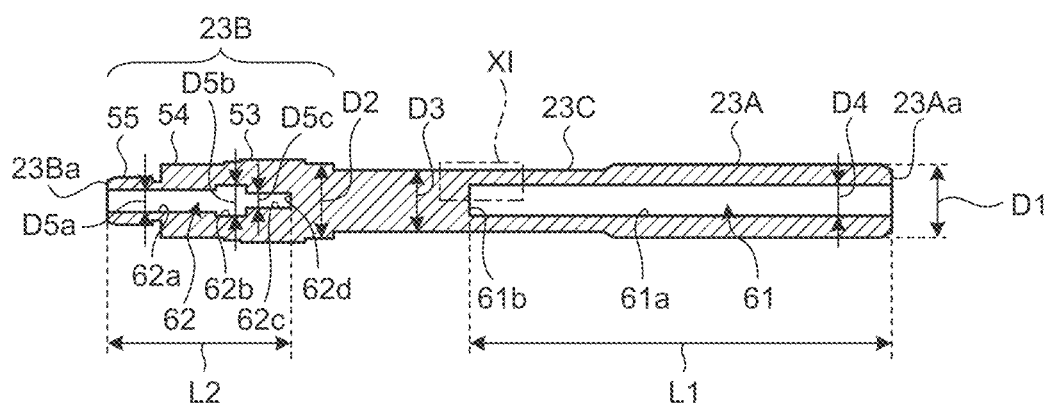
FIG. 5 is a cross-sectional view along the line V-W in FIG. 4.
Figure 6:
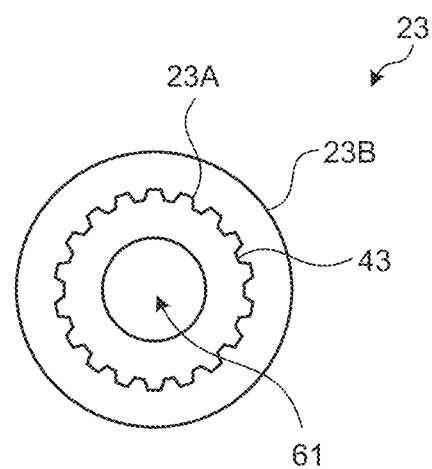
FIG. 6 is a side view of the torque sensor shaft according to the first embodiment viewed from a spline shaft part side.
Figure 7:
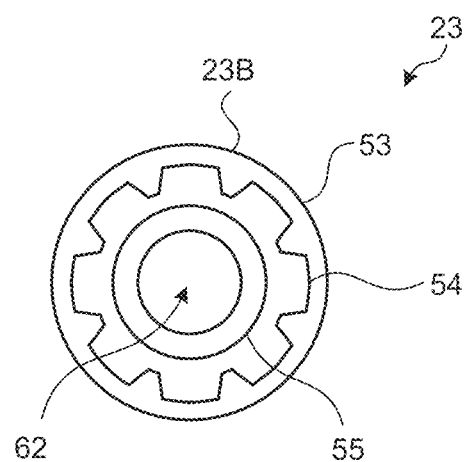
FIG. 7 is a side view of the torque sensor shaft according to the first embodiment viewed from a stopper part side.

Next, the following describes a configuration of the torque sensor shaft 23 with reference to FIG. 4 to FIG. 7. FIG. 4 is a front view of the torque sensor shaft according to the first embodiment. FIG. 5 is a cross-sectional view along the line V-V' in FIG. 4. FIG. 6 is a side view of the torque sensor shaft according to the first embodiment viewed from a spline shaft part side. FIG. 7 is a side view of the torque sensor shaft according to the first embodiment viewed from a stopper part side. The line V-V' illustrated in FIG. 4 is a line along the center axis of the torque sensor shaft 23.

As illustrated in FIG. 4, the torque sensor shaft 23 includes the first shaft part 23A, the second shaft part 23B, and the third shaft part 23C. In the present embodiment, the torque sensor shaft 23 is made of carbon steel for machine structural use (for example, JIS standard. S35C). The torque sensor shaft 23 is not limited thereto, and may be made of copper, aluminum, brass, and the like. The first shaft part. 23A is a spline shaft part on which the spline groove 43 is formed. As illustrated in FIG. 6, the spline groove 43 is formed along the axial direction of the first shaft part 23A. The second shaft part 23B is disposed on the output shaft 22B side. The second shaft part 23B includes a large-diameter part 53, a stopper part 54, and a cylinder part 55. The cylinder part 55 is engaged with a second cylinder part 22Bb of the output shaft 22B (refer to FIG. 3) via a bearing. Due to this, concentricity of the output shaft 22B and the second shaft part 23B is secured.

As illustrated in FIG. 7, a spline part including a plurality car projections and depressions is formed on an outer peripheral surface of the stopper part 54. The projections and depressions are alternately disposed along a circumferential direction. Each of the projections and depressions is disposed along the axial direction as illustrated in FIG. 4. In the output shaft 22B, a first cylinder part 22Ba (refer to FIG. 3) is disposed to be closer to the X2 direction side than the second cylinder part 22Bb. A plurality of projections and depressions are formed on an inner peripheral surface of the first cylinder part 22Ba along the circumferential direction. The projections and depressions of the stopper part 54 engage with the projections and depressions of the first cylinder part 22Ba with a gap in the circumferential direction. As illustrated in FIG. 3, the output shaft 22B is coupled with the torque sensor shaft. 23 by the torsion bar 22C.

When large torque is input to the torque sensor shaft 23, the projections and depressions of the stopper part 54 abut on the projections and depressions of the first cylinder part. 22Ba to enable transmission of large torque. The large-diameter part 53 has an outer diameter larger than that of the stopper part 54 and the cylinder part 55.

As illustrated in FIG. 4, the third shaft part 23C is an intermediate shaft part disposed between the first shaft part. 23A and the second shaft part 23B, and couples the first shaft part 23A with the second shaft part 23B. In the present embodiment, the first shaft part 23A, the second shaft part 23B, and the third shaft part 23C are integrally disposed, and the second shaft part 23B is connected to the output shaft 22B. That is, the second shaft part 23B also functions as an input shaft that is conventionally disposed separately from the torque sensor shaft 23 and engages with the output shaft 22B. Thus, the number of members constituting the torque sensor shaft 23 is reduced. Additionally, the number of processes for coupling respective members is reduced, so that production cost can be reduced, and reliability of torque transmission can be improved.

The third shaft part 23C has a right circular cylinder shape, and has a uniform outer diameter D3 in a direction along the axial direction. The outer diameter D3 of the third shaft part 23C is smaller than an outer diameter D2 of the large-diameter part 53 of the second shaft part 23B. The outer diameter D3 of the third shaft part 23C is smaller than an outer diameter D1 of the first shaft part 23A. In this case, the outer diameter D1 of the first shaft part 23A is assumed to be an outer diameter of a circle connecting crest parts of the spline groove 43 in the circumferential direction. The outer diameter D2 of the large-diameter part 53 of the second shaft part 23B is assumed to be an outer diameter of the large-diameter part 53 in the vicinity of a stepped part 52 between the second shaft part 23B and the third shaft part 23C.

A work-hardened layer 51 formed by drawing and press (described later) is disposed on almost the entire region of the third shaft part 23C in the axial direction and the circumferential direction. Hardness of the third shaft part 23C is uniform in a direction along the axial direction from the vicinity of a boundary between the third shaft part 23C and the first shaft part 23A to the vicinity of a boundary between the third shaft part 23C and the second shaft part 23B, and is higher than the hardness of the second shaft part 23B. The hardness indicates a value measured for an outer peripheral surface of each shaft part, and is a value measured by using a method such as the Vickers hardness test and the Rockwell hardness test. In the present specification, a "uniform inner diameter", a "uniform outer diameter", and "uniform hardness" represent a case in which the inner diameter, the outer diameter, and the hardness indicate the same value at any point in the axial direction, and may include an error and the like caused in a manufacturing process, for example.

In this way, the outer diameter and the hardness of the third shaft part 23C are uniform in the direction along the axial direction, so that, even when torque equal to or larger than reference torque is applied, the third shaft part 23C is plastically deformed by being twisted to absorb impact energy, so that the third shaft part 23C can favorably absorb impact energy. The hardness of the third shaft part 23C is higher than the hardness of the second shaft part 23B in the vicinity of the stepped part 52 on which stress concentrates, so that early rupture can be prevented even when torque equal to or larger than the reference torque is input.

As illustrated in FIG. 5, an end part of the first shaft part 23A has a first hole part 61. The first hole part 61 is formed by a plurality of times of cold forging as described later. As illustrated in FIG. 5 and FIG. 6, the first hole part 61 opens at an end face 23Aa of the first shaft part 23A, and is recessed in the axial direction. An inner wall surface 61a of the first hole part 61 is disposed along the axial direction of the first shaft part 23A and the third shaft part 23C, and a bottom face 61b of the first hole part 61 is disposed at a center part in the axial direction of the third shaft part 23C. The position of the bottom face 61b is not limited to the center part in the axial direction of the third shaft part 23C, and the bottom face 61b may be disposed at one end part side or the other end part side of the third shaft part 23C. In the example illustrated in FIG. 5, a depth L1 of the first hole part 61 is larger than the length in the axial direction of the first shaft part 23A. The first hole part 61 has an inner diameter D4 that is substantially uniform. The inner diameter D4 is smaller than the outer diameter D1 of the first shaft part 23A and the outer diameter D3 of the third shaft part 23C. The depth L1 of the first hole part 61 is five or more times the inner diameter D4.

Due to this, the first hole part 61 is disposed at least in the first shaft part 23A, so that the weight of the torque sensor shaft 23 can be reduced. There is known a method of forming the first hole part 61 by cutting instead of cold forging. In a case of cutting, it is difficult to form the depth L1 of the first hole part 61 to be large. Additionally, in a case of cutting, a metal flow is interrupted, so that the strength may be reduced when the depth L1 of the first hole part 61 is increased.

In the present embodiment, the first hole part 61 is formed by a plurality of times of cold forging without performing cutting, so that the metal flow can be prevented from being interrupted. Due to this, the strength can be prevented from being reduced even when the depth L1 of the first hole part 61 is formed to be large. Additionally, the first hole part 61 is formed by cold forging, so that a working time and the number of processes can be reduced, production cost can be suppressed, and a yield can be improved.

As illustrated in FIG. 5, an end part of the second shaft part 23B has a second hole part 62. The second hole part 62 is formed by a plurality of times of cold forging and cutting as described later. As illustrated in FIG. 5 and FIG. 7, the second hole part 62 opens at an end face 23Ba of the second shaft part 23B, and is recessed in the axial direction. In the second hole part 62, a first inner wall surface 62a, a second inner wall surface 62b, and a third inner wall surface 62c are formed along the axial direction of the second shaft part 23B. The first inner wall surface 62a of the second hole part 62 is disposed inside the cylinder part 55 and the stopper part 54. The second inner wall surface 62b is disposed on the third shaft part 23C side of the first inner wall surface 62a. The second inner wall surface 62b is disposed inside the large-diameter part 53. An inner diameter D5b of the second inner wall surface 62b is larger than an inner diameter D5a of the first inner wall surface 62a.

The third inner wall surface 62c and a bottom face 62d are disposed on the third shaft part 23C side of the second inner wall surface 62b. The third inner wall surface 62c and the bottom face 62d are disposed inside the large-diameter part 53. An inner diameter D5c of the third inner wall surface 62c smaller than the inner diameter D5a of the first inner wall surface 62a, and smaller than the inner diameter D5b of the second inner wall surface 62b. An end part of the torsion bar 22C is coupled into a space surrounded by the third inner wall surface 62c.

In this way, the second hole part 62 is disposed in the second shaft part 23B, so that the weight of the torque sensor shaft 23 can be reduced. At least the first inner wall surface 62a and the second inner wall surface 62b of the second hole part 62 are formed by cold forging. Due to this, even in a case in which the depth L2 of the second hole part 62 is formed to be large, the strength can be prevented from being reduced. Additionally, the second hole part 62 is formed by cold forging, so that the working time and the number of processes can be reduced, the production cost can be suppressed, and the yield can be improved.

The first hole part 61 is disposed in the first shaft part 23A, and the second hole part 62 is disposed in the second shaft part 23B. Due to this, the center of gravity and a natural frequency of the torque sensor shaft 23 can be adjusted in addition to reduction in the weight thereof. The first hole part 61 includes the bottom face 61b, and the second hole part 62 includes the bottom face 62d. That is, the first hole part 61 and the second hole part 62 are blind holes. Due to this, at least part of the second shaft part 23B and at least part of the third shaft part 23C become solid. Thus, strength can be secured by causing a point on which stress concentrates to be solid without disposing the first hole part 61 and the second hole part 62. If the first hole part 61 or the second hole part 62 is a through hole, it is required to prepare a short blank 90 (refer to FIG. 8), make the through hole, and perform drawing. Due to this, the production cost may be increased.

Additionally, the first shaft part 23A, the second shaft part 23B, and the third shaft part 23C are integrally disposed, and there is no portion for coupling a plurality of members by fitting and the like, so that reliability of torque transmission can be improved at lower cost. Accordingly, the weight of the torque sensor shaft 23 can be reduced, and reliability of torque transmission can be improved. The outer diameter D2 of the large-diameter part 53 of the second shaft part 23B is larger than the outer diameter D3 of the third shaft part 23C. Due to this, even when the diameter of the output shaft 23B (refer to FIG. 3) is changed, only the stopper part 54 should be changed, and the outer diameter D2 of the large-diameter part 53 can be prevented from being changed.

Manufacturing Method

Figure 8:
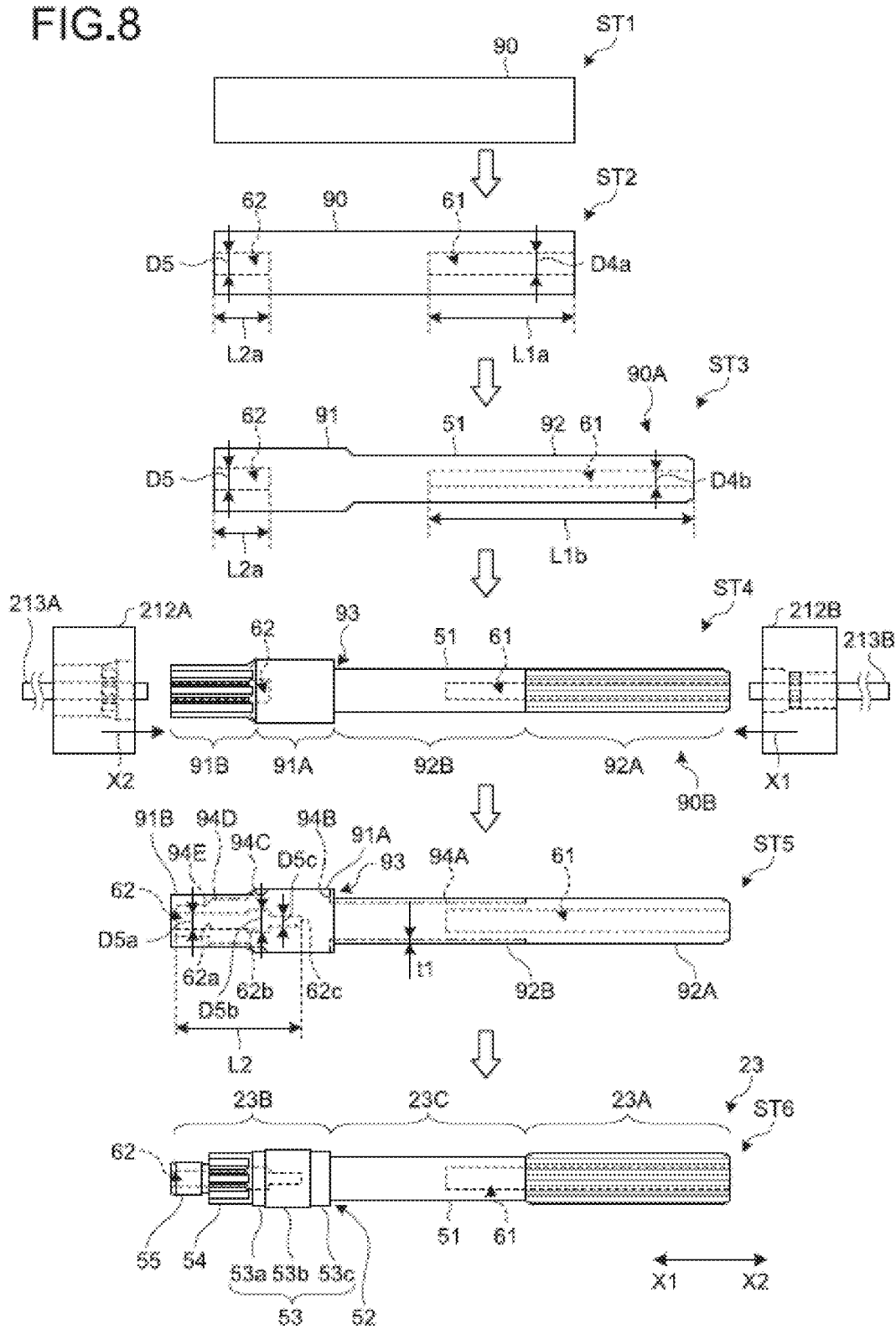
FIG. 8 is an explanatory diagram for explaining a manufacturing process for the torque sensor shaft.
Figure 9:
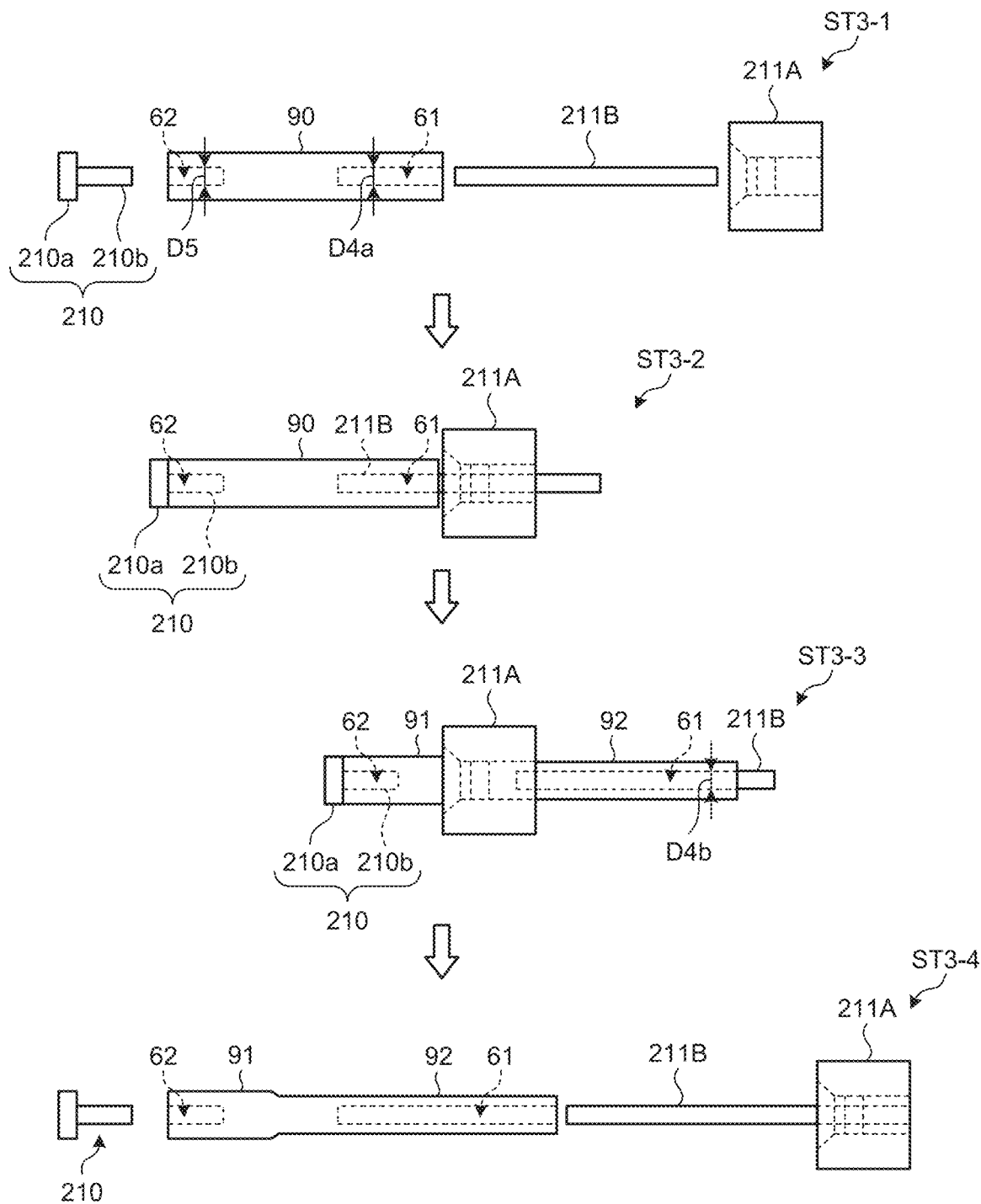
FIG. 9 is an explanatory diagram for explaining drawing and deep hole work at Step ST3 illustrated in FIG. 8.
Figure 10:
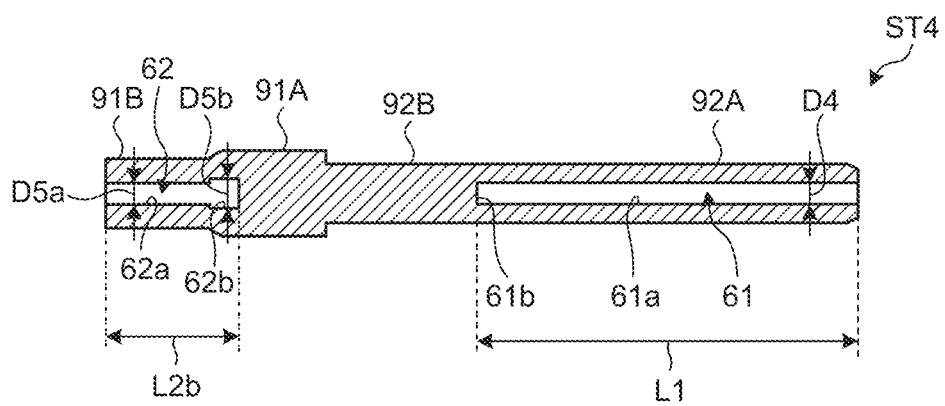
FIG. 10 is a cross-sectional view of a forged product at Step ST4 illustrated in FIG. 8.

FIG. 8 is an explanatory diagram for explaining a manufacturing process for the torque sensor shaft. FIG. 9 is an explanatory diagram for explaining drawing and deep hole work at Step ST3 illustrated in FIG. 8. FIG. 10 is a cross-sectional view of a forged product at Step ST4 illustrated in FIG. 8. FIG. 10 illustrates a cross-sectional view obtained by cutting a forged product 90B along the center axis thereof.

First, as illustrated in FIG. 8, the blank (material shaft) 90 is prepared (Step ST1). The blank 90 is, for example, a metallic material having a pillar shape or a round bar shape. As the blank 90, carbon steel for machine structural use (for example, JIS standard S35C) can be used. The blank 90 is not limited thereto, and may be made of copper, aluminum, brass, and the like. Next, hole drilling for the blank 90 is performed (Step ST2). In the hole drilling, used is a punch die corresponding to a shape of a hole to be formed. Punch dies are pressed into both ends of the blank 90 by cold forging. Due to this, the first hole part 61 is formed at one end side of the blank 90, and the second hole part 62 is formed at the other end side thereof. In this case, the first hole part 61 at Step ST2 is formed to have an inner diameter D4a and a depth L1a. For example, the inner diameter D4a of the first hole part 61 is about 40% or more and 60% or less of the outer diameter of the blank 90. The depth L1a of the first hole part 61 is about five or more times the inner diameter D4a. The second hole part 62 is formed to have an inner diameter D5 and a depth L2a. In the present embodiment, the solid blank 90 having a pillar shape is used, so that the cost can be reduced as compared with a case of using a hollow blank having a cylindrical shape.

Next, drawing is performed on the blank 90 (Step ST3) in this process, a side of the blank 90 on which the first hole part 61 is formed is pressed into a die by cold forging. Due to this, a blank 90A is formed, the blank 90A including a first blank part 91 and a second blank part 92 having an outer diameter smaller than that of the first blank part 91. At the same time, the first hole part 61 is stretched in the axial direction. Accordingly, an inner diameter D4b becomes smaller than the inner diameter D4a at Step ST2, and a depth L1b becomes larger than the depth L1a of the first hole part 61 at Step ST2. The embodiment is not limited thereto, and the inner diameter D4b may be substantially equal to the inner diameter D4a.

Specifically, as illustrated in FIG. 9, a punch die 210, a metal die 211A, and a mandrel 211B are prepared (Step ST3-1). The punch die 210 includes a supporting part 210a, and a mandrel part 210b projecting from the supporting part 210a. The mandrel part 210b has an outer diameter and a length corresponding to the inner diameter D5 and the depth L2a of the second hole part 62 formed at Step ST2. On the other hand, an external shape of the mandrel 211B is smaller than the inner diameter D4a of the first hole part 61 formed at Step ST2, and the length thereof in the axial direction is larger than the depth L1a of the first hole part 61. The mandrel part 210b and the mandrel 211B have a round bar shape. However, the embodiment is not limited thereto, and the mandrel part 210b and the mandrel 211B may have a polygonal shape in a cross-sectional view.

Next, the punch die 210 is pushed into the other end side of the blank 90, and the mandrel 211B is inserted into the first hole part 61 (Step ST3-2). The mandrel part 210b is inserted into the second hole part 62 of the blank 90, and the supporting part 210a supports the other end side of the blank 90. Due to this, the second hole part 62 is prevented from being deformed. The mandrel 211B is brought into contact with the bottom face 61b of the first hole part 61, and has a predetermined gap with respect to the first hole part 61 in a radial direction.

The blank 90 is pushed into the metal die 211A, and drawing and stretching for the first hole part 61 are performed (Step ST3-3). At this point, the blank 90 is pushed into the metal die 211A in a state in which the mandrel 211B is inserted into the first hole part 61. Due to this, the diameter of the second blank part 92 becomes smaller than the diameter of the blank 90 before the drawing by 20% or more and 30% or less. Accordingly, the work-hardened layer 51 (refer to FIG. 8) is formed on the second blank part 92. At the same time, the first hole part 61 is stretched in the axial direction, and the depth L1b of the first hole part 61 becomes about twice the depth L1a before the drawing. Of the blank 90, a portion subjected to drawing is formed as the second blank part 92, and a portion not subjected to drawing is formed as the first blank part 91.

The first blank part 91 is not subjected to drawing, so that the outer diameter of the first blank part 91 is substantially the same as the outer diameter of the blank 90 at Step ST2, and the inner diameter D5 and the depth L2a of the second hole part 62 are also substantially the same as those at Step ST2.

The punch die 210, the mandrel 211B, and the metal die 211A are then removed from the blank 90A (Step ST3-4).

Accordingly, the blank 90A including the first blank part 91 and the second blank part 92 is formed. The first blank part 91 is a portion at which the second shaft part 23B is expected to be formed, and the second blank part 92 is a portion at which the first shaft part 23A and the third shaft part 23C are expected to be formed. The entire length in the axial direction of the blank 90A ds longer than that of the blank 90 before the drawing.

Next, as illustrated in FIG. 8, the blank 90A is subjected to press (Step ST4). A metal die 212A is pushed into the first blank part 91 of the blank 90A along the X2 direction to perform press. Thereafter, a metal die 212B is pushed into the second blank part 92 along the X1 direction to perform press. Similarly to the process illustrated in FIG. 9, in the press illustrated at Step ST4, the second blank part 92 is subjected to press in a state in which a mandrel 213B is inserted into the first hole part 61. The first blank part 91 is subjected to press in a state in which a mandrel 213A is inserted into the second hole part 62. Due to this, the first hole part 61 and the second hole part 62 can be prevented from being crushed. The press for the first blank part 91 and the press for the second blank part 92 may be performed at the same time in the same process. The press for the first blank part 91 and the press for the second blank part 92 may be performed reverse order.

Through the press, the forged product 903 having a shape close to the shape of the torque sensor shaft 23 is formed. As illustrated at Step ST4 in FIG. 8, the forged product 90B includes a large-diameter part 91A, a stopper part 91B, an intermediate shaft part 92B, and a spline shaft part 92A. Through the press, a spline groove along the axial direction is formed on an outer circumference of the spline shaft part 92A. Additionally, stretching for the first hole part 61 and the second hole part 62 is performed. A spline part including projections and depressions along the axial direction is formed on an outer circumference of the stopper part 91B. The large-diameter part 91A is a portion that is not subjected to drawing and grooving.

The spline shaft part 92A is a portion at which the first shaft part 23A is expected to be formed. The large-diameter part 91A is a portion of the second shaft part 23B at which the large-diameter part 53 is expected to be formed. The stopper part 91B is a portion of the second shaft part 23B at which the stopper part 54 and the cylinder part 55 are expected to be formed. The intermediate shaft part 92B is a portion at which the third shaft part 23C is expected to be formed. The work-hardened layer 51 is formed on the intermediate shaft part 92B by the drawing and the press described above.

At the same time, as illustrated in FIG. 10, the inner diameter D4 of the first hole part 61 becomes smaller than the inner diameter D4b (refer to FIG. 8) at Step ST3, and the depth L1 is further prolonged with respect to the depth L1b (refer to FIG. 8) before the press. The inner diameter D4 of the first hole part 61 is restricted by the diameter of the mandrel 213B.

The depth L2b in the axial direction of the second hole part 62 becomes larger than the depth L2a before the press (refer to FIG. 8). The inner diameter D5a of a portion of the second hole part 62 overlapped with the stopper part 912 becomes smaller than the inner diameter D5 at Step ST3 (refer to FIG. 8). The inner diameter D5a of the second hole part 62 is restricted by the diameter of the mandrel 213A. On the other hand, a portion of the second hole part 62 overlapped with the large-diameter part 91A is a portion at which a deformation amount in the radial direction due to press is small, and has the inner diameter D5b that is the same as or slightly smaller than the inner diameter D5 at ST3 (refer to FIG. 8). That is, the inner diameter D5b of a portion surrounded by the second inner wall surface 62b is formed to be larger than the inner diameter D5a of a portion surrounded by the first inner wall surface 62a. The inner diameter D4 of the first hole part 61 becomes smaller than an inner diameter of at least part of the second hole part 62, that is, the inner diameter D5b of a portion surrounded by the second inner wall surface 62b. The embodiment is not limited thereto, and the first hole part 61 may be formed to have the inner diameter D4 larger than the inner diameter D5b of the second hole part 62.

In this way, deep hole work for the first hole part 61 and deep hole work for the second hole part 62, can be performed in the same process, so that the number of processes can be reduced.

Next, as illustrated in FIG. 8, the forged product 902 is subjected to cutting (Step ST5). At Step ST5, an external shape after cutting is represented by a two-dot chain line. The intermediate shaft part 92B is cut by a thickness t1 with respect to the outer diameter thereof to have a shape of a first cutting part 94A. The thickness t1 for the cutting is about 10% or more and 20% or less of the diameter of the intermediate shaft part 92B before the cutting. Due to this, about 60% or more and 70% or less of the work-hardened layer 51 remains with respect to the diameter of the intermediate shaft part 92B after the cutting. A stepped part 93 between the intermediate shaft part 92B and the large-diameter part 91A is cut in the X1 direction to have a shape of a second cutting part 94B. That is, through the cutting, the length in the axial direction of the intermediate shaft part 92B is prolonged corresponding to a cut length, and the length in the axial direction of the large-diameter part 91A is shortened corresponding to at least the cut length. The large-diameter part 91A and the stopper part 91B are subjected to cutting to have the shapes of a third cutting part 94C, a fourth cutting part 94D, and a fifth cutting part 94E.

Additionally, the second hole part 62 is subjected to cutting. Due to this, a recessed part surrounded by the third inner wall surface 62c is formed on the intermediate shaft part 92B side (X2 direction side) in the axial direction with respect to the second inner wall surface 62b. The third inner wall surface 62c is formed inside the large-diameter part 91A. As described above, the inner diameter D5c of the third inner wall surface 62c is smaller than the inner diameter D5a of the first inner wall surface 62a, and smaller than the inner diameter D5b of the second inner wall surface 62b.

Through such cutting, the torque sensor shaft 23 is manufactured (Step ST6). Through the cutting, the stopper part 91B is worked to be the cylinder part 55 and the stopper part 54, and the large-diameter part 91A is worked to have the shape of the large-diameter part 53. The large-diameter part 53 includes a first portion 53a adjacent to the stopper part 54, a second portion 53b having a diameter larger than that of the first portion 53a, and a third portion 53c that couples the second portion 53b with the third shaft part 23C.

Through the processes described above, the first hole part 61 is formed by three times of cold forging illustrated at Step ST2, Step ST3, and Step ST4. Due to this, as illustrated in FIG. 5, the inner diameter D4 of the first hole part 61 can be reduced, and the depth L1 along the axial direction can be prolonged. For example, the first hole part 61 is formed to have the depth L1 that is five or more times the inner diameter D4. The depth L1 can be, for example, about twelve times or more and thirteen times or less than the inner diameter D4. In the deep hole work for the first hole part 61 illustrated at Step ST3 and Step ST4, the inner diameter D4 may be the same before and after working.

The second hole part 62 is formed by two times of cold forging illustrated at Step ST2 and Step ST4. Due to this, a process is performed to reduce the inner diameter of the second hole part 62 and prolong the length along the axial direction. It is possible to reduce the working time and the number of processes required for the cutting for the third inner wall surface 62c into which the torsion bar 22C is inserted, and the production cost can be suppressed. By reducing the cutting, position accuracy of the second hole part 62 is improved or working defects caused by cutting chips are reduced, and the yield can be improved as compared with a case of forming the entire second hole part 62 by cutting.

The first shaft part 23A, the second shaft part 23B, and the third shaft part 23C are integrally formed from the one blank 90. Due to this, there is no portion for coupling a plurality of members by fitting and the like, so that reliability of torque transmission of the torque sensor shaft 23 can be improved. The first hole part 61 and the second hole part 62 are respectively disposed on both ends of the blank 90, so that the weight can be further reduced.

The present embodiment describes the example of working the torque sensor shaft 23 by cold forging, but the embodiment is not limited thereto. The torque sensor shaft 23 may be formed by plastic work such as hot forging or warm forging, for example.

As described above, the method of manufacturing the torque sensor shaft 23 according to the present embodiment is a method of manufacturing the torque sensor shaft 23 including the first shaft part 23A (spline shaft part) coupled with the input shaft 22A, the stopper part 54 coupled with the output shaft 22B, and the third shaft part 23C (intermediate shaft part) that couples the first shaft part 23A with the stopper part 54, and the method includes: the process of forming the first hole part 61 recessed in the axial direction from one end of the pillar-shaped blank 90 (material) by cold forging (Step ST2); and the process of pressing the blank 90 in which the first hole part 61 has been formed into a die to perform drawing in the radial direction on a portion of the blank 90 at which the first shaft part 23A and the third shaft part 23C are formed, and prolonging the length along the axial direction of the first hole part 61 at the same time by cold forging (Step ST3).

Due to this, the first hole part 61 of the spline shaft part is formed to be a deep hole by at least two times of cold forging. Accordingly, the weight of the shaft for a steering device can be reduced. Cutting is not performed in working the first hole part 61, so that the working time and the processes can be reduced, the production cost can be suppressed, and the yield can be improved. Additionally, the spline shaft part and the intermediate shaft part are formed from one material at the same time, and there is no portion for coupling a plurality of members by fitting and the like, so that reliability of torque transmission can be improved. Thus, the weight of the shaft for a steering device can be reduced, and reliability of torque transmission can be improved.

The torque sensor shaft 23 according to the present embodiment includes the first shaft part 23A (spline shaft part) to be coupled with the input shaft 22A, the stopper part 54 to be coupled with the output shaft 22B, and the third shaft part 23C (intermediate shaft part) that is disposed integrally with the first shaft part 23A and the stopper part 54 and couples the first shaft part 23A with the stopper part 54, and the end part of the first shaft part 23A has the first hole part 61 that is formed by cold forging and is recessed in the axial direction, having the uniform inner diameter D4.

The electric power steering device 100 according to the present embodiment (refer to FIG. 1) includes the torque sensor shaft 23, the output shaft 22B that is coupled with the second shaft part 23B and includes the reduction gear 32 rotated by torque input from the electric motor 31 attached thereto, and the torsion bar 22C that couples the output shaft 22B with the torque sensor shaft 23. Due to this, the number of members of the electric power steering device 100 is reduced, so that the production cost can be reduced. The first hole part 61 and the second hole part 62 are formed in the torque sensor shaft 23, so that the weight of the electric power steering device 100 can be reduced.

EXAMPLE

Figure 11:
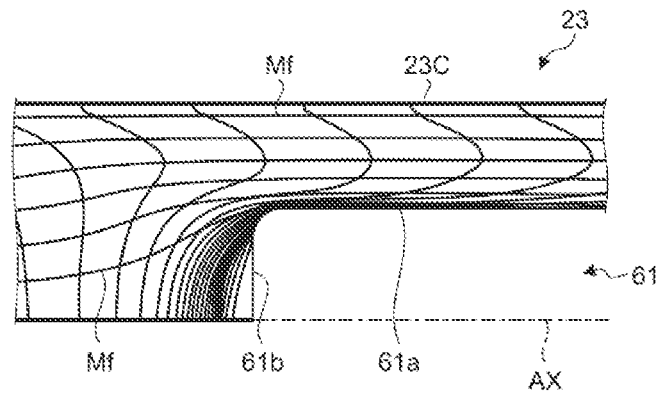
FIG. 11 is an explanatory diagram illustrating an analysis result of a metal flow of a torque sensor shaft according to an example.
Figure 12:
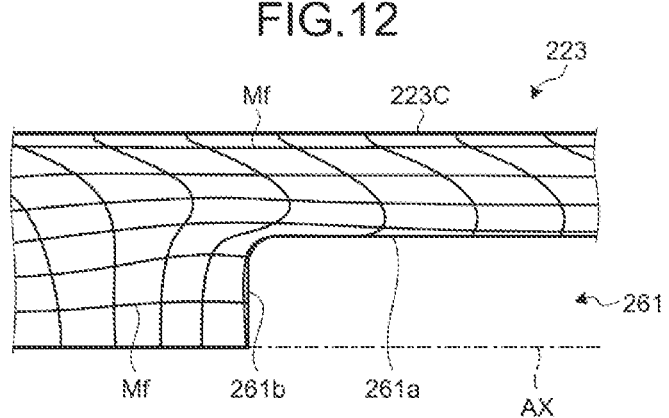
FIG. 12 is an explanatory diagram illustrating an analysis result of a metal flow of a torque sensor shaft according to a first comparative example.
Figure 13:
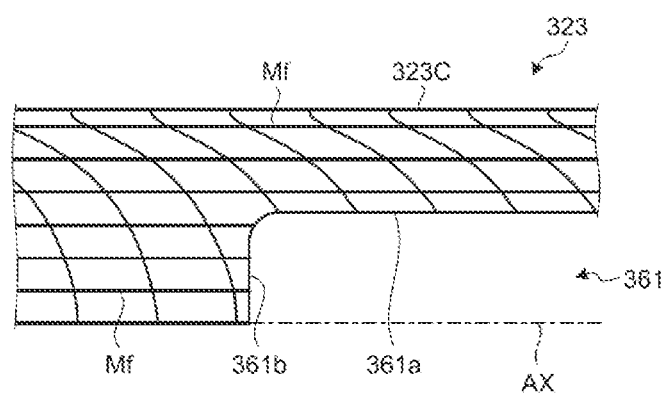
FIG. 13 is an explanatory diagram illustrating an analysis result of a metal flow of a torque sensor shaft according to a second comparative example.

FIG. 11 is an explanatory diagram illustrating an analysis result of a metal flow of the torque sensor shaft according to an example. FIG. 12 is an explanatory diagram illustrating an analysis result of the metal flow of the torque sensor shaft according to a first comparative example. FIG. 13 is an explanatory diagram illustrating an analysis result of the metal flow of the torque sensor shaft according to a second comparative example.

FIG. 11 is an expanded cross-sectional view illustrating a region XI illustrated in FIG. 5 of the torque sensor shaft 23 according to the example. FIG. 12 is a cross-sectional view of a point corresponding to the region XI of a torque sensor shaft 223 according to the first comparative example. FIG. 13 is a cross-sectional view of a point corresponding to the region XI of a torque sensor shaft 323 according to the second comparative example.

A metal flow Mf illustrated in FIG. 11, FIG. 12, and FIG. 13 represents a flow of a metal structure that is generated when a metallic material is plastically deformed by forging. FIG. 11, FIG. 12, and FIG. 13 each represent a result obtained by performing Computer Aided Engineering (CAE) analysis using a finite element method and the like. As an etchant, 50 vol % of hydrochloric acid aqueous solution was used. Photography was performed by setting observation magnification of the metallurgical microscope to be 10.

As illustrated in FIG. 11, in the torque sensor shaft 23 according to the example, the metal flow Mf at a position overlapped with the bottom face 61b of the first hole part 61 is deformed along the shape of the first hole part 61. That is, the metal flow Mf at the position overlapped with the bottom face 61b of the first hole part 61 is continuously formed along the inner wall surface 61a and a corner part formed by the bottom face 61b and the inner wall surface 61a. The metal flow Mf at a position not overlapped with the bottom face 61b is formed in substantially parallel with the center axis AX along the inner wall surface 61a although being slightly deformed. Due to this, the metal flow Mf aggregates in the vicinity of the inner wall surface 61a. The metal flow Mf in the vicinity of the inner wall surface 61a is formed more densely than the metal flow Mf in the vicinity of the outer circumference of the third shaft part 23C.

In the torque sensor shaft 23B according to the first comparative example illustrated in FIG. 12, a first hole part 261 is formed by cutting at Step ST2 of the manufacturing process illustrated in FIG. 3. Thereafter, shaft drawing and deep hole work are performed cold forging, and the first hole part 261 is formed.

As illustrated in FIG. 12, the first hole part 261 is formed in the torque sensor shaft 223 according to the first comparative example by cutting, so that the metal flow Mf at the position overlapped with a bottom face 261b of the first hole part 261 is interrupted by the bottom face 261b. In other words, an end part of the metal flow Mf is brought into contact with the bottom face 261b, and the metal flow Mf is not continuously formed along an inner wall surface 261a. The metal flow Mf does not aggregate in the vicinity of the inner wall surface 261a although slightly deforms around the first hole part 261. That is, a degree of aggregation of the metal flow Mf in the vicinity of the inner wall surface 261a is substantially the same as a degree of aggregation of the metal flow Mf in the vicinity of the outer circumference of a third shaft part 223C.

In the torque sensor shaft 323 according to the second comparative example illustrated in FIG. 13, a first hole part 361 is formed by cutting after shaft drawing is performed by cold forging. That is, the first hole part 361 is formed only by cutting, and is not subjected to deep hole work by cold forging.

As illustrated in FIG. 13, in the torque sensor shaft 323 according to the second comparative example, the metal flow Mf at a position overlapped with a bottom face 361b of the first hole part 361 is interrupted by the bottom face 361b similarly to the first comparative example. In other words, the end part of the metal flow Mf is brought into contact with the bottom face 361b, and the metal flow Mf is not continuously formed along an inner wall surface 361a. The metal flow Mf is not deformed around the first hole part 361, and does not aggregate in the vicinity of the inner wall surface 361a. That is, the degree of aggregation of the metal flow Mf in the vicinity of the inner wall surface 361a is substantially the same as the degree of aggregation of the metal flow Mf in the vicinity of the outer circumference of a third shaft part 323C.

As described above, in the torque sensor shaft 23 according to the example, the metal flow Mf is prevented from being interrupted by the bottom face 61b as compared with the torque sensor shafts 223 and 323 according to the first and the second comparative examples. The metal flow Mf is deformed and continuously formed along the inner wall surface 61a, and aggregates in the vicinity of the inner wall surface 61a. Due to this, the strength of the torque sensor shaft 23 according to the example can be prevented from being reduced even when the depth L1 of the first hole part 61 is formed to be large.

FIG. 11 illustrates an example in which the first hole part 61 is formed in the third shaft part 23B. The embodiment is not limited thereto, and the bottom face 61b may be positioned in the first shaft part. 23A (refer to FIG. 5). Also in this case, the metal flow Mf is deformed and continuously formed along the inner wall surface 61a, and aggregates in the vicinity of the inner wall surface 61a. That is, the metal flow Mf in the vicinity of the inner wall surface 61a is formed more densely than the metal flow Mf in the vicinity of the outer circumference of the first shaft part 23A.

FIG. 11 illustrates the metal flow Mf around the first hole part 61, and the same applies to the second hole part 62 illustrated in FIG. 5. That is, at least the first inner wall surface 62a of the second hole part 62 is subjected to deep hole work by a plurality of times of cold forging. Due to this, the metal flow Mf aggregates in the vicinity of the first inner wall surface 62a. The metal flow Mf in the vicinity of the first inner wall surface 62a is formed more densely than the metal flow MS in the vicinity of the outer circumference of the stopper part 54 and the cylinder part 55. Due to this, even when the depth L2 of the second hole part 62 is formed to be large, the strength can be prevented from being reduced.

Second Embodiment

Figure 14:
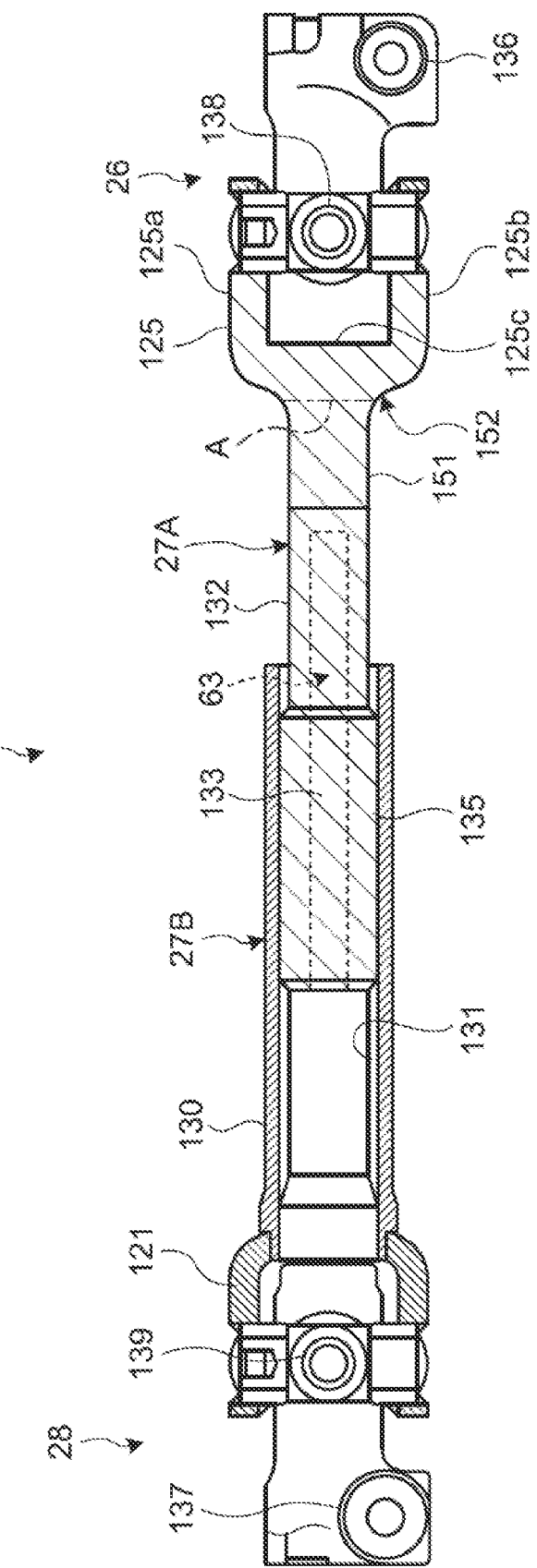
FIG. 14 is a schematic cross-sectional view of an intermediate shaft according to a second embodiment.
Figure 15:
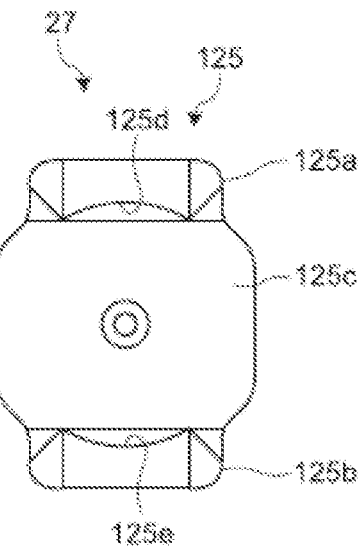
FIG. 15 is a side view of a yoke of the intermediate shaft viewed from an axial direction.

FIG. 14 is a schematic cross-sectional view of the intermediate shaft according to a second embodiment. FIG. 15 is a side view of a yoke of the intermediate shaft viewed from the axial direction. The intermediate shaft 27 according to the present embodiment includes the upper shaft 27A and the lower shaft 27B. The upper shaft 27A is connected to the output shaft 22B (refer to FIG. 1) via the universal joint 26. On the other hand, the lower shaft 27B is connected to the pinion shaft 29A (refer to FIG. 1) of the steering gear mechanism 29 via the universal joint 28. In this case, the upper shaft 27A corresponds to a specific example of the "shaft for a steering device" according to the present invention.

As illustrated in FIG. 14, the upper shaft 27A includes a yoke 125, a shaft part 132, and a spline shaft part 133. In the present embodiment, the upper shaft 27A is made of carbon steel for machine structural use (for example, JIS standard S15C). The upper shaft 27A is not limited thereto, and may be made of copper, aluminum, brass, and the like. The yoke 125, the shaft part 132, and the spline shaft part 133 are integrally formed. The yoke 125 is connected to the output shaft 22B via the universal joint 26. The universal joint 26 includes a joint yoke 130 and a spider 138. The yoke 125 includes two arm parts 125a and 125b, and a base 125c. The arm parts 125a and 125b are connected to the base 125c. The arm parts 125a and 125b extend in a direction parallel with the axial direction, and are disposed to be opposed to each other in a direction intersecting with the axial direction.

As illustrated in FIG. 15, the base 125c has a substantially rectangular shape. The arm part 125a is disposed on one of two opposed sides of the base 125c, and the arm part 125b is disposed on the other one side. Recessed parts 125d and 125e are respectively formed on opposed surfaces of the arm part 125a and the arm part 125b.

As illustrated in FIG. 14, a spline groove 135 is disposed on an outer circumference of the splice shaft part 133, and the spline groove 135 engages with an outer tube 130 of the lower shaft 273. The shaft part 132 (intermediate shaft part) is placed between the yoke 125 and the spline shaft part 133 to couple the yoke 125 with the spline shaft part 133. The shaft part 132 is connected to an opposite side of the surface of the base 125c to which the arm parts 125a and 125b are connected. In the present embodiment, a hole part 63 is formed, the hole part 63 recessed in the axial direction from an end part of the spline shaft part 133. The hole part 63 is disposed inside the spline shaft part 133 and the shaft part 132. In the present embodiment, the hole part 63 is formed by a plurality of times of cold forging.

The lower shaft 27B includes the outer tube 130 and a yoke 121. The yoke 121 is connected to the pinion shaft 29A via the universal joint 28. The universal joint 28 includes a joint yoke 137 and a spider 139. The configuration of the universal joint 28 is not limited thereto. The outer tube 130 is a hollow cylindrical member, and connected to the yoke 121. A spline groove 131 is disposed on an inner circumference of the outer tube 130, and the spline groove 135 of the spline shaft part 133 engages with the spline groove 131 of the outer tube 130. The embodiment is not limited thereto, and the yoke 121 and the outer tube 13C may be integrally formed.

With such a configuration, the upper shaft 27A and the lower shaft 27B are spline-coupled, so that the intermediate shaft 27 can transmit torque of the output shaft 22B, and can relatively move in a direction parallel with the axial direction. When the upper shaft 27A and the lower shaft 27B relatively move in the axial direction, the intermediate shaft 27 stretches and contracts.

In the upper shaft 27A according to the present embodiment, the yoke 125, the spline shaft part 133, and the shaft part 132 are integrally disposed, so that a process of coupling the yoke 125 with the shaft part 132 by welding and the like can be omitted, for example, and the production cost can be reduced.

An outer diameter of the shaft part 132 is smaller than a size of the yoke 125 in a direction intersecting with the axial direction, and is uniform in a direction along the axial direction. The outer diameter of the shaft part 132 is smaller than a length of at least one side of the base 125c. Specifically, the outer diameter of the shaft part 132 is smaller than an interval between the two sides of the base 125c illustrated in FIG. 15 on which the arm parts 125a and 125b are disposed. Additionally, hardness of the shaft part 132 is higher than hardness of the yoke 125, and is uniform in a direction along the axial direction from the vicinity of a boundary between the shaft part 132 and the spline shaft part 133 to the vicinity of a boundary between the shaft part 132 and the yoke 125. Due to this, even when torque equal to or larger than reference torque is applied, the shaft part 132 is plastically deformed by twisting, so that impact energy is absorbed by the shaft part 132. Thus, the upper shaft 27A can favorably absorb impact energy.

A stepped part 152 is formed by the shaft part 132 and the yoke 125, and a work-hardened layer 151 is formed on the shaft part 132 to a position in the vicinity of the stepped part 152 (for example, a position indicated by a dot-dash line A). Due to this, the hardness of the shaft part 132 in the vicinity of the stepped part 152 is higher than the hardness of the yoke 125 in the vicinity of the stepped part 152. With such a configuration, the hardness of the shaft part 132 is high in the vicinity of the stepped part 152 on which stress concentrates, so that early rupture can be prevented even when torque equal to or larger than the reference torque is input.

In the present embodiment, the upper shaft 27A is connected to the output shaft 22B (refer to FIG. 1), and the lower shaft 27B is connected to the pinion shaft 29A (refer to FIG. 1) of the steering gear mechanism 29. However, the embodiment is not limited thereto. The upper shaft 27A may be connected to the pinion shaft 29A, and the lower shaft 27B may be connected to the output shaft 22B.

Manufacturing Method According to Second Embodiment

Figure 16:
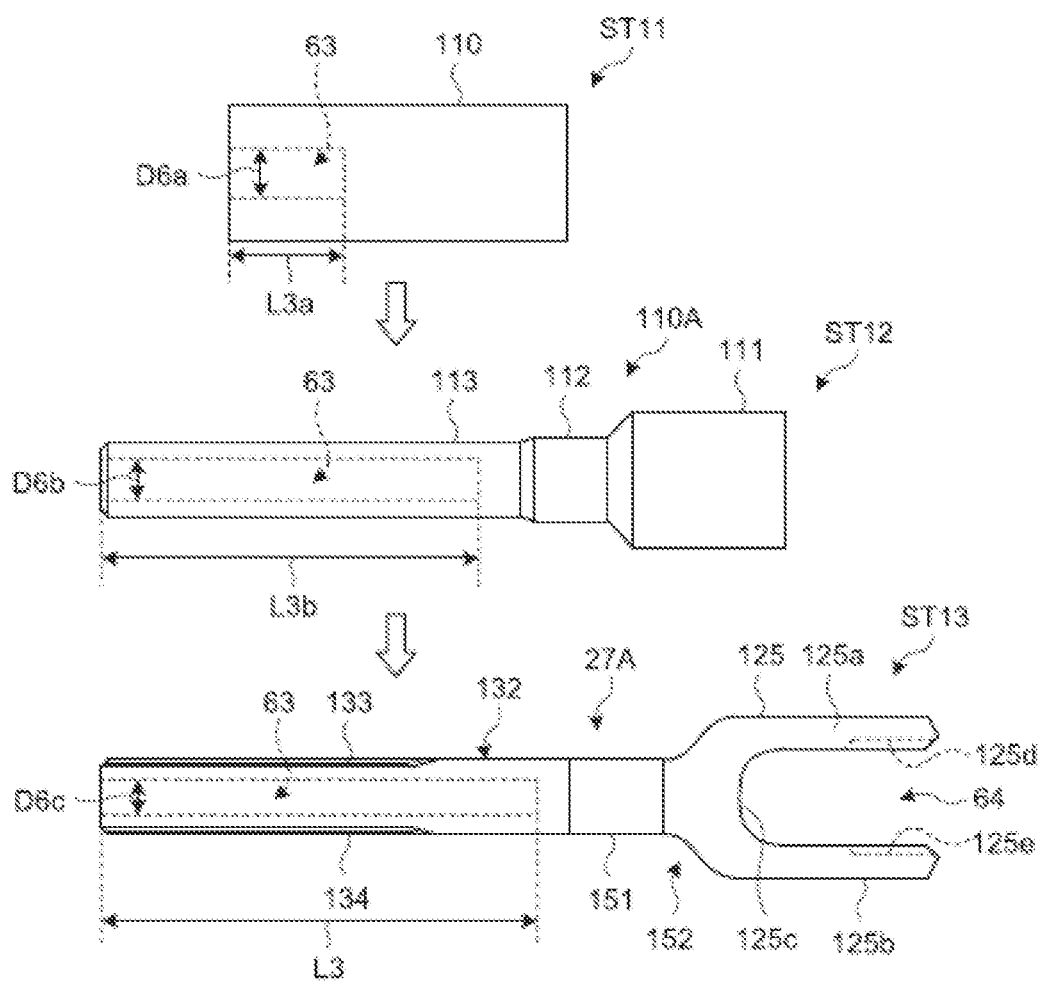
FIG. 16 is an explanatory diagram for explaining a manufacturing process of the intermediate shaft according to the second embodiment.

FIG. 16 is an explanatory diagram for explaining a manufacturing process of the intermediate shaft according to the second embodiment. First, as illustrated in FIG. 16, a blank (material shaft) 110 is prepared, and the blank 110 is subjected to hole drilling (Step ST11). As the blank 110, for example, carbon steel for machine structural use (for example, JIS standard S15C) can be used. The blank 110 is not limited thereto, and may be made of copper, aluminum, brass, and the like. In the hole drilling, used is a punch die corresponding to a shape of a hole to be formed. The punch die is pressed into one end of the blank 110 by cold forging. Due to this, the hole part 63 is formed at one end of the blank 110. In this case, the hole part 63 is formed to have an inner diameter $D6a$ and a depth $L1a$. In the present embodiment, the solid blank 110 having a pillar shape is used, so that the cost can be reduced as compared with a case of using a hollow blank having a cylindrical shape.

Next, the blank. 110 is subjected to drawing (Step ST12). Due to this, a blank 110A is formed, the blank 110A including a first blank part 111, a second blank part 112 having an outer diameter smaller than that of the first blank part 111, and a third blank part 113 having an outer diameter smaller than that of the second blank part 112. Specifically, similarly to the process illustrated in FIG. 9, one end of the blank 110 is pushed into a metal die (not illustrated) in a state in which a mandrel (not illustrated) is inserted into the hole part 63. Due to this, the hole part 63 is stretched in the axial direction, an inner diameter $D6b$ becomes smaller than the inner diameter $D6a$ at Step ST11, and a depth $L3b$ becomes larger than the depth $L3a$ at Step ST11. The first blank part 111 is not subjected to drawing, and the outer diameter of the first blank part 111 is substantially the same as the outer diameter of the blank. 110 at Step ST11.

Next, the blank 110A is subjected to press work (Step ST13). The third blank part 113 is subjected to press in a state in which the mandrel (not illustrated) is inserted into the hole part 63. Through the press, a spline groove 134 along the axial direction is formed on the outer circumference of the third blank part 113. At the same time, the hole part 63 is further extended in the axial direction, an inner diameter $D6c$ becomes smaller than the inner diameter $D6b$ at Step ST12, and a depth $L3$ becomes larger than the depth $L1b$ at Step ST12. Due to this, the spline shaft part 133 and the shaft part 132 are formed.

A recessed part 64 is formed on the first blank part 111 by cold forging. Due to this, the yoke 125 including the base 125c and the arm parts 125a and 125b is formed. The process of forming the spline shaft part 133 and the shaft part 132, and the process of forming the yoke 125 may be performed at the same time, or may be separately performed.

Through the process described above, in the present embodiment, the hole part 63 is formed by three times of cold forging illustrated at Step ST11, Step ST12, and Step ST13. Due to this, as illustrated in FIG. 16, the inner diameter $D6c$ of the hole part 63 can be reduced, and the depth $L3$ along the axial direction can be increased. For example, the depth $L3$ may be caused to be substantially twelve times or more and thirteen times or less the inner diameter $D6c$ of the hole part 63.

The spline shaft part 133, the shaft part 132, and the yoke 125 are integrally formed from one blank 110. Due to this, there is no portion for coupling a plurality of members by fitting and the like, so that reliability of torque transmission of the upper shaft 27A can be improved. Accordingly, the weight of the upper shaft 27A can be reduced, and reliability of torque transmission can be improved.

The present embodiment describes the example of working the upper shaft 27A by cold forging, but the embodiment is not limited thereto. The upper shaft 27A may be formed by plastic work such as hot forging or warm forging, for example.

The configurations of the torque sensor shaft 23 and the upper shaft 27A described above may be appropriately changed. The configurations of the torque sensor shaft 23 and the upper shaft 27A are merely examples, and the outer diameter, the length, and the like of each shaft part may be appropriately changed. The inner diameter and the depth of the first hole part 61, the second hole part 62, and the hole part 63 are merely examples, and can be appropriately changed. The shape and the like of the yoke 125 of the upper shaft 27A may also be appropriately changed.

REFERENCE SIGNS LIST

21 STEERING WHEEL
22 STEERING SHAFT

22A INPUT SHAFT
22B OUTPUT SHAFT
22C TORSION BAR
23 TORQUE SENSOR SHAFT
23A FIRST SHAFT PART
23B SECOND SHAFT PART
23C THIRD SHAFT PART
24 TORQUE SENSOR
26, 28 UNIVERSAL JOINT
27 INTERMEDIATE SHAFT
27A UPPER SHAFT
27B LOWER SHAFT
29 STEERING GEAR MECHANISM
42, 43, 135 SPLINE GROOVE
45 HOUSING
51 WORK-HARDENED LAYER
53 LARGE-DIAMETER PART
54 STOPPER PART
55 CYLINDER PART
61 FIRST HOLE PART
62 SECOND HOLE PART
62a FIRST INNER WALL SURFACE
62b SECOND INNER WALL SURFACE
62c THIRD INNER WALL SURFACE
125 YOKE
130 OUTER TUBE
132 SHAFT PART
133 SPLINE SHAFT PART
90, 90A BLANK
90B FORGED PRODUCT
91A LARGE-DIAMETER PART
91B STOPPER PART
92B INTERMEDIATE SHAFT PART
100 ELECTRIC POWER STEERING DEVICE

The invention claimed is:

1. A method of manufacturing a shaft for a steering device that comprises a spline shaft part to be coupled with an input shaft, a stopper part to be coupled with an output shaft, and an intermediate shaft part that couples the spline shaft part with the stopper part, the method comprising:
a step of forming a hole part recessed in an axial direction from one end of a pillar-shaped material by forging; and
a step of pressing the material in which the hole part has been formed into a die to perform drawing in a radial direction on a portion of the material at which the spline shaft part and the intermediate shaft part are to be formed, prolonging a length along the axial direction of the hole part, and reducing a diameter of the hole part, at the same time by forging,
wherein a mandrel is inserted into the hole part to perform the forging.

2. The method of manufacturing the shaft for a steering device according to claim 1, the method comprising:
a step of forming a spline groove along the axial direction on an outer circumference of a portion of the material at which the spline shaft part is to be formed by pressing the material into a die, by forging.

3. The method of manufacturing the shaft for a steering device according to claim 1, wherein the hole part is continuously formed along the axial direction from an end part of the spline shaft part to the intermediate shaft part.

4. The method of manufacturing the shaft for a steering device according to claim 1, wherein the length along the axial direction of the hole part is five or more times the diameter of the hole part.

5. The method of manufacturing the shaft for a steering device according to claim 1, wherein
the hole part includes a bottom face intersecting with the axial direction, and an inner wall surface along the axial direction, and
a metal flow at a position overlapped with the bottom face is continuously formed along the inner wall surface.

6. A method of manufacturing a shaft for a steering device that comprises a spline shaft part to be coupled with an input shaft, a stopper part to be coupled with an output shaft, and an intermediate shaft part that couples the spline shaft part with the stopper part, the method comprising:
a step of forming a hole part recessed in an axial direction from one end of a pillar-shaped material by forging; and
a step of pressing the material in which the hole part has been formed into a die to perform drawing in a radial direction on a portion of the material at which the spline shaft part and the intermediate shaft part are to be formed, and prolonging a length along the axial direction of the hole part at the same time by forging,
wherein a mandrel is inserted into the hole part to perform the forging,
the hole part includes a bottom face intersecting with the axial direction, and an inner wall surface along the axial direction,
a metal flow at a position overlapped with the bottom face is continuously formed along the inner wall surface, and
the metal flow in the vicinity of the inner wall surface is formed more densely than a metal flow in the vicinity of an outer circumference of the spline shaft part or the intermediate shaft part.

* * * * *